United States Patent [19]

Niessner et al.

[11] Patent Number: 5,258,473

[45] Date of Patent: * Nov. 2, 1993

[54] PREPARATION OF FINELY DIVIDED, WATER-SOLUBLE POLYMERS

[75] Inventors: Manfred Niessner, Schifferstadt; Stefan Wickel; Walter Schneider, both of Ludwigshafen; Juergen Beck, Viernheim; Heinrich Hartmann, Limburgerhof; Thomas Meyer, Boehl-Iggelheim, all of Fed. Rep. of Germany

[73] Assignee: BASF Aktiengesellschaft, Ludwigshafen, Fed. Rep. of Germany

[*] Notice: The portion of the term of this patent subsequent to Sep. 22, 2009 has been disclaimed.

[21] Appl. No.: 663,019

[22] Filed: Mar. 1, 1991

Related U.S. Application Data

[63] Continuation-in-part of Ser. No. 438,876, Feb. 3, 1989.

[30] Foreign Application Priority Data

Mar. 8, 1990 [DE] Fed. Rep. of Germany ........ 4007313

[51] Int. Cl.⁵ ............................ C08F 2/08; C08F 20/06
[52] U.S. Cl. ........................................ 526/78; 526/81; 526/88; 526/207; 526/317.1
[58] Field of Search ............... 526/78, 81, 88, 207, 526/317.1

[56] References Cited

U.S. PATENT DOCUMENTS

| | | | |
|---|---|---|---|
| 2,982,749 | 5/1961 | Friedrich et al. | 260/23 |
| 3,232,915 | 2/1966 | Bush et al. | 526/81 |
| 3,284,393 | 11/1966 | Vanderhoff et al. | 260/29.6 |
| 4,286,082 | 8/1981 | Tsubakimoto et al. | 526/240 |
| 4,769,427 | 9/1988 | Nowakowsky et al. | 526/64 |
| 4,879,361 | 11/1989 | Rehmer et al. | 526/201 |
| 4,880,886 | 11/1989 | Kondo et al. | 526/80 |
| 5,149,750 | 9/1992 | Niessner et al. | |

FOREIGN PATENT DOCUMENTS

| | | |
|---|---|---|
| 238050 | 9/1987 | European Pat. Off. |
| 289338 | 11/1988 | European Pat. Off. |
| 2146343 | 4/1985 | United Kingdom |

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

Finely divided, water-soluble polymers are prepared by polymerization of water-soluble, monoethylenically unsaturated monomers in not less than 20% strength by weight aqueous solution in the presence of a polymerization initiator in a kneader by a process in which from 0.1 to 10% by weight, based on the total monomers, of a surfactant are used in the polymerization, the polymerization initially being carried out to a conversion of the monomers of not less than 60% in the absence of the surfactant or in the presence of not more than 50% of the amount of surfactant, and the remaining amount of surfactant then being added to the reaction mixture and the polymerization completed. The addition of surfactant causes the polymer gel to disintegrate with formation of fine particles.

3 Claims, No Drawings

PREPARATION OF FINELY DIVIDED, WATER-SOLUBLE POLYMERS

This is a continuation-in-part application of Ser. No. 07/438,876 filed Nov. 20, 1989, now U.S. Pat. No. 5,149,750, granted Sep. 22, 1992.

Finely divided, water-soluble polymers can be prepared, for example, by the process of reverse suspension polymerization of water-soluble monomers in hydrocarbons. Special protective colloids are required for this process. The bead polymers obtained are separated from the hydrocarbon phase and must then be freed from adhering hydrocarbons. Processes of this type are described in for example, U.S. Pat. Nos. 2,982,749 and 4,879,361.

Particularly finely divided, water-soluble polymers can be obtained, for example, from water-in-oil polymer emulsions by precipitation and isolation of the polymers (cf. U.S. Pat. No. 3,284,393). Relatively coarse-particled, water-soluble polymers are obtainable, for example, by gel polymerization of water-soluble monomers on a belt reactor or in a plunger-type reactor. The polymer gels formed in each case must be comminuted in relatively expensive steps.

U.S. Pat. No. 4,286,082 discloses a process for the preparation of crosslinked, water-absorbing polymers, in which alkali metal acrylates or mixtures of alkali metal acrylates and acrylic acid are polymerized together with a crosslinking monomer which contains from 2 to 4 ethylenically unsaturated double bonds in the molecule, in the presence of surfactants, in not less than 25% strength by weight aqueous solution, and the resulting polymer gel is dried at elevated temperatures. The purpose of the surfactant is to improve the copolymerization of the water-soluble monomers with the crosslinking agents. After the end of the polymerization, it is present on the surface and in the interior of the gel particles. The surfactant must be added to the reaction mixture before the polymerization. According to the Patent, the addition of the surfactant after the end of the polymerization has an adverse effect on the quality of the product.

GB-A-2 146 343 discloses a process for the continuous preparation of water-absorbing crosslinked polymers in a twin-screw kneader, in which aqueous solutions of ethylenically unsaturated carboxylic acids, which may be partially neutralized, are copolymerized together with a crosslinking agent in the presence of conventional polymerization initiators. Polymer particles whose diameter generally does not exceed 3 cm and is usually from 0.05 to 1 cm are obtained. Since the particle size has a direct effect on the diffusion of the water during the drying process, larger gel particles must be dried for a longer time than smaller ones.

U.S. Pat. No. 4,769,427 discloses a process for the preparation of crosslinked, finely divided, polymer gels in single-screw mixers having a high degree of self-purging. Monomer mixtures which contain, per 100 parts by weight of an acrylic acid or methacrylic acid, each having a degree of neutralization of from 50 to 100 mol %, acrylamide, methacrylamide or N-vinylpyrrolidone, from 0.01 to 5 parts by weight of a crosslinking agent are subjected to polymerization in 20–65% strength by weight aqueous solution in the presence of polymerization initiators at from 45° to 95° C., and some of the water is removed from the reaction mixture during the polymerization under reduced pressure, so that a crumb-like gel having a solids content of from 30 to 70% by weight is discharged.

A similar process is disclosed in EP-A-0 238 050, in which the copolymerization, for example of methacrylic acid or acrylic acid, which may be neutralized with an alkali metal base, and a crosslinking agent is carried out in a plurality of stages in a batchwise mixing apparatus with continuous thorough mixing in all stages, in the first stage of the polymerization the aqueous monomer solution being copolymerized at from 45° to 95° C. and from 0.1 to 0.8 bar with partial removal of water by distillation, and in the second stage the copolymerization being completed at from 100° to 170° C. and not more than 8 bar and, after the pressure has been let down, the water content of the resulting finely divided, crosslinked copolymer being reduced to 0.5–10% by weight in the third stage. In the two last-mentioned processes, a crumb-like polymer gel is formed and can be only partially dried in the polymerization reactor. During the subsequent polymerization and during the drying, the polymer gel is subjected to stronger or weaker shearing, resulting in an undesirable change in the gel structure.

EP-A-0 289 338 discloses the preparation of hydrophilic polymers having a low residual monomer content, in which water-soluble monomers are polymerized in a twin-screw kneader, preferably in the presence of crosslinking agents, and the resulting finely divided polymer is dried with a steam-containing gas at from 80° to 250° C.

It is an object of the present invention to provide a process for the preparation of finely divided, water-soluble polymers, which process is improved compared with the prior art.

We have found that this object is achieved, according to the invention, by a process for the preparation of finely divided, water-soluble polymers by polymerization of water-soluble, monoethylenically unsaturated monomers in not less than 20% strength by weight aqueous solution in the presence of a free radical initiator in a kneader with formation of a finely divided, water-soluble polymer gel, if from 0.1 to 10% by weight, based on the total monomers, of a surfactant are used in the polymerization, polymerization initially being carried out to a conversion of the monomers of not less than 60% in the absence of the surfactant or in the presence of not more than 50% of the amount of surfactant, and the remaining amount of surfactant then being added to the reaction mixture and the polymerization completed.

Water-soluble monoethylenically unsaturated monomers of group (a) are, for example, ethylenically unsaturated $C_3$–$C_6$-carboxylic acids and their amides and esters with aminoalcohols of the formula

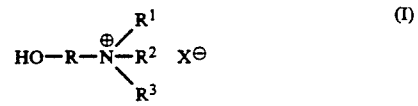

(I)

where R is $C_2$–$C_5$-alkylene $R^1$, $R^2$ and $R^3$ are each H, $CH_3$, $C_2H_5$ or $C_3H_7$. These compounds are, for example, acrylic acid, methacrylic acid, crotonic acid, itaconic acid, maleic acid, fumaric acid, acrylamide, methacrylamide, crotonamide, dimethylaminoethyl acrylate, diethylaminoethyl acrylate, dimethylaminopropyl acrylate, dimethylaminobutyl acrylate, diethylaminoethyl methacrylate, dimethylaminoethyl methacrylate, dimethylaminopropyl acrylate, dimethylaminoneopentyl acrylate and dimethylaminoneopentyl methacrylate. The basic acrylates and methacrylates are used in the form of the salts with strong mineral acids, sulfonic acids or carboxylic acids or in quaternized form. The anion $X^\ominus$ for the compounds of the formula I is the acid radical of the mineral acids or the carboxylic acids, or methosulfate, ethosulfate or halide from a quaternizing agent.

Alkylamides of the formula

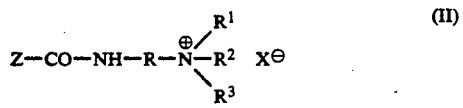

(II)

where R is $C_2$-$C_5$-alkylene, $R^1$, $R^2$ and $R^3$ are each H, $CH_3$, $C_2H_5$ or $C_3H_7$, Z—CO is an acyl radical of an ethylenically unsaturated $C_3$-$C_6$-carboxylic acid and $X^\ominus$ has the meanings stated for formula I. Examples of compounds of the formula II are dimethylaminopropylacrylamide and dimethylaminopropylmethacrylamide. The basic alkylaminoacrylamides are used in the form of their salts with strong mineral acids, sulfonic acids or carboxylic acids or in quaternized form.

Other water-soluble monomers (a) are, for example, hydroxyethyl acrylate, hydroxypropyl acrylate, hydroxyethyl methacrylate, hydroxypropyl methacrylate and/or acrylonitrile, N-vinylpyrrolidone, acrylamidopropanesulfonic acid, vinylphosphonic acid and/or alkali metal or ammonium salts of vinylsulfonic acid and N-vinylamides, such as N-vinylformamide, N-vinyl-N-methylformamide, N-vinylacetamide, N-vinyl-N-methylacetamide and mixtures thereof. The monomers containing acid groups can likewise be used either in unneutralized form or in partially or completely neutralized form in the polymerization.

Other suitable water-soluble monomers of group (a) are diallylammonium compounds, such as dimethyldiallylammonium chloride, diethyldiallylammonium chloride or diallylpiperidiniun bromide, N-vinylimidazolium compounds, such as salts or quaternization products of N-vinylimidazole and 1-vinyl-2-methylimidazole, and N-vinylimidazolines, such as N-vinylimidazoline, 1-vinyl-2-methylimidazoline, 1-vinyl-2-ethylimidazoline or 1-vinyl-2-n-propylimidazoline, which are likewise used in quaternized form or as a salt in the polymerization. Preferred monomers of group (a) are acrylic acid, methacrylic acid, acrylamide and/or methacrylamide. These monomers can be copolymerized with one another in any ratio. For example, copolymers of 95% by weight of acrylic acid and 5% by weight of acrylamide or copolymers of 95% by weight of acrylamide and 5% by weight of acrylic acid can be prepared. The ethylenically unsaturated carboxylic acids can be polymerized in the form of the free acids or in completely or partially (e.g. 5-95%) neutralized form. Sodium hyroxide solution, potassium hydroxide solution, ammonia or an amine is preferably used for neutralization. Preferably employed monomers for the preparation of homo- and copolymers are furthermore the abovementioned acrylates and methacrylates of aminoalcohols, for example dimethylaminoethyl acrylate or dimethylaminoethyl methacrylate, and (meth)acrylic acid aminoalkylamides, each of which is polymerized as a salt of a strong acid or in quaternized form.

If a change in the properties of the polymers is desired, the polymerization of the water-soluble monomers of group (a) can additionally be carried out in the presence of water-insoluble monomers of group (b). In the present context the monomers are regarded water-insoluble if they have a solubility of less than 1% by weight in water at 20° C.; otherwise, i.e. if the monomers have a solubility of 1% by weight or more in water at 20° C., they are regarded as water-soluble. Examples of suitable monomers of group (b) are methacrylonitrile and esters of acrylic acid or methacrylic acid with monohydric alcohols of 1 to 18 carbon atoms, for example methyl acrylate, ethyl acrylate, propyl acrylate, isopropyl acrylate, n-butyl acrylate, isobutyl acrylate, hexyl acrylate, 2-ethylhexyl acrylate, stearyl acrylate, the corresponding esters of methacrylic acid, diethyl fumarate, diethyl maleate, dimethyl maleate, dibutyl maleate, vinyl acetate and vinyl propionate. If the monomers of group (b) are used for modifying the water-soluble polymers, from 0.5 to 20, preferably from 2 to 10, mol %, based on the monomers (a), are used.

The polymerization may be carried out in the presence or absence of the conventional polymerization regulators. Examples of suitable polymerization regulators are thio compounds, such as thioglycollic acid, mercaptoalcohols, e.g. 2-mercaptoethanol, mercaptopropanol and mercaptobutanol, dodecyl mercaptan, formic acid, aldehydes, ammonia and amines, e.g. ethanolamine, diethanolamine, triethanolamine, triethylamine, morpholine and piperidine.

The monomers (a) and, if required, (b) are polymerized in 20-80, preferably 30-60, % strength by weight aqueous solution in the presence of a polymerization initiator. All compounds which decompose into free radicals under the polymerization conditions can be used as polymerization initiators, for example peroxides, hydroperoxides, hydrogen peroxide, persulfates, azo compounds and the redox catalysts. The use of water-soluble catalysts is preferred. In some cases, it is advantageous to employ mixtures of different polymerization initiators for example mixtures of hydrogen peroxide and sodium peroxydisulfate or potassium peroxydisulfate. Mixtures of hydrogen peroxide and sodium peroxydisulfate in any ratio may be used. Examples of suitable organic peroxides are acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, tert-butyl per-3,5,5-trimethylhexanoate and tert-amyl perneodecanoate. Other suitable polymerization initiators are azo initiators, e.g. 2,2'-azobis-(2-amidinopropane) hydrochloride, 2,2'-azobis-(N,N'-dimethylene)-isobutyramidine dihydrochloride, 2-carbamoylazoisobutyronitrile and 4,4'-azobis-(4-cyanovaleric acid). The stated polymerization initiators are used in conventional amounts, for example in amounts of from 0.01 to 5, preferably from 0.1 to 2, mol %, based on the monomers to be polymerized.

The redox catalysts contain one or more of the abovementioned per compounds as an oxidizing component and, for example, ascorbic acid, glucose, sorbose or ammonium or alkali metal bisulfite, sulfite, thiosulfate, hyposulfite, pyrosulfite or sulfide, metal salts, such as iron(II) ions or silver ions or sodium hydroxymethylsulfoxylate, as a reducing component. Ascorbic acid or sodium pyrosulfite is preferably used as the reducing component of the redox catalyst. From $3 \cdot 10^{-4}$ to 1 mol % of the reducing component of the redox catalyst system and from 0.01 to 5 mol % of the oxidizing component of the redox catalyst are preferably used, the percentages being based on the amount of monomers used in the polymerization. Instead of the oxidizing component of said catalyst, it is also possible to use one or more water-soluble azo initiators.

For the preparation of finely divided, gel-like, water-soluble homo- and copolymers, according to the invention surfactants are required. All surfactants which have an HLB value of not less than 3 are suitable for this purpose (for the definition of the HLB value, see W. C. Griffin, J. Soc. Cosmetic Chem. 5 (1954), 249). Examples of suitable nonionic surfactants are the adducts of ethylene oxide, propylene oxide or a mixture of ethylene oxide and propylene oxide with alkylphenols, aliphatic alcohols, carboxylic acids and amines. For example, $C_8$–$C_{12}$-alkylphenols alkoxylated with ethylene oxide and/or propylene oxide are suitable. Commercial products of this type are, for example, octylphenols or nonylphenols, each of which has been reacted with from 4 to 20 moles of ethylene oxide per mole of phenol. Other nonionic surfactants are ethoxylated $C_{10}$–$C_{24}$-fatty alcohols or ethoxylated $C_{10}$–$C_{24}$-fatty acids and ethoxylated $C_{10}$–$C_{24}$-fatty amines or ethoxylated $C_{10}$–$C_{24}$-fatty amides. Poly-hydric $C_3$–$C_6$-alcohols partially esterified with $C_{10}$–$C_{24}$-fatty acids are also suitable. The esters may additionally be reacted with from 2 to 20 moles of ethylene oxide. Examples of suitable fatty alcohols which are alkoxylated for the preparation of the surfactants are palmityl alcohol, stearyl alcohol, myristyl alcohol, lauryl alcohol, oxo alcohols and unsaturated alcohols, such as oleyl alcohol. The fatty alcohols are ethoxylated or propoxylated, or reacted with ethylene oxide and propylene oxide, to such an extent that the reaction products are soluble in water. In general, 1 mole of the abovementioned fatty alcohols is reacted with from 2 to 20 moles of ethylene oxide and, if required, not more than 5 moles of propylene oxide, so that surfactants having an HLB value of more than 8 are obtained.

$C_3$–$C_6$-alcohols which are partially esterified and may be ethoxylated for the preparation of the surfactants are, for example, glycerol, sorbitol, mannitol and pentaerythritol. These polyhydric alcohols are partially esterified with $C_{10}$–$C_{24}$-fatty acids, for example oleic acid, stearic acid or palmitic acid. The esterification with the fatty acids is carried out at most to a degree such that one or more OH groups of the polyhydric alcohol remain unesterified. Examples of suitable esterification products are sorbitan monooleate, sorbitan tristearate, mannityl monooleate, glyceryl monooleate and glyceryl dioleate. The stated fatty esters of polyhydric alcohols which may still contain one or more free OH groups may be modified by furthermore being reacted with ethylene oxide, propylene oxide or a mixture of ethylene oxide and propylene oxide. Preferably from 2 to 20 moles of the stated alkylene oxide are used per mole of fatty ester. It is known that the degree of ethoxylation affects the HLB value of the nonionic surfactants. By a suitable choice of the alkoxylating agent and of the amount of alkoxylating agent, it is possible to prepare surfactants having HLB values of from 3 to 20 in a technically simple manner.

Another group of suitable substances are homopolymers of ethylene oxide, block copolymers of ethylene oxide and alkylene oxide, preferably propylene oxide, and polyfunctional block copolymers which are formed, for example, by sequential addition of propylene oxide and ethylene oxide with diamines.

The nonionic surfactants can be used either alone or as a mixture with one another. There are many possible variations: for example, surfactants having a different degree of ethoxylation or alkoxylated phenols may be used together with ethoxylated fatty alcohols or ethoxylated fatty alcohol derivatives. Other suitable surfactants are $C_8$–$C_{24}$-alkylsulfonates, which are preferably used in the form of the alkali metal salts, $C_8$–$C_{24}$-alkylsulfates, which are preferably employed in the form of the alkali metal or trialkanolammonium salts, sulfosuccinic diesters, for example the sodium salt of di-2-ethylhexyl sulfosuccinate, sulfosuccinic half-esters, for example the disodium salt of ricinoleic acid/monoethanolamidosulfosuccinic acid or disodium fatty alcohol polyglycol ether sulfosuccinate, $C_8$–$C_{24}$-alkylarylsulfonic acids, for example the disodium salt of dodecylphenoxyphenyldisulfonic acid, and the sulfuric half-esters of adducts of ethylene oxide with alkylphenols or fatty alcohols. Examples of suitable cationic surfactants are the adducts of alkylene oxides with fatty amines or salts of fatty amines, for example pentaoxyethylstearylammonium acetate, or ethoxylated methyloleylamine methosulfate, and long-chain alkylbenzyldimethylammonium compounds, such as $C_{10}$–$C_{22}$-alkylbenzyldimethylammonium chloride. Other suitable cationic surfactants are the salts of fatty amines, for example coconut fatty ammonium acetate, quaternary fatty aminoesters, for example di-fatty acid isopropyl ester dimethylammonium ethosulfate, and quaternary fatty aminoamides, for example N-undecylenamidopropyl-N-trimethylammonium methosulfate. Amphoteric surfactants, for example those which carry one or more quaternary ammonium cations and one or more carboxylate or sulfonate anions in the same molecule, are also suitable. Commercial products of this type are, for example, dimethylcarboxymethyl fatty acid alkylamidoammonium betaines or 3-(3-fatty acid amidopropyl)-dimethylammonium 2-hydroxypropanesulfonates. The ionic surfactants can be used alone or as a mixture with one another, provided that the surfactant mixture does not lead to precipitation of the surfactants in water.

The surfactants are used in amounts of from 0.1 to 10, preferably from 0.5 to 5, % by weight, based on the monomers employed in the copolymerization.

As stated above, the polymerization is carried out in aqueous solution. Since the viscosity of the reaction mixture increases sharply in the course of the polymerization, mixing apparatuses having a high degree of self-purging are required for the polymerization. The degree of self-purging of the suitable mixing apparatuses is above 80%. The degree of self-purging is understood as the percentage ratio of the proportion of purged areas to the total area of the mixing elements of the mixer. Suitable apparatuses which have a high self-purging effect are described in, for example, Chemie-Ingenieur-Technik, 57 (1985), 1005. These apparatuses are preferably kneaders or suitably designed extruders. The mixing apparatuses may have one or more screws. A suitable apparatus having a high self-purging effect is disclosed in U.S. Pat. No. 4,769,427, discussed in relation to the prior art. The polymerization can be carried out both continuously and batchwise.

According to the invention, the surfactant is added in a special manner to the reaction mixture which is polymerized. If a water-insoluble monomer of the group (b) is present for modifying the water-soluble polymers, not more than 50% of the intended amount of surfactant are added to the aqueous monomer solution to be polymerized. If exclusively water-soluble monomers are polymerized, the polymerization is preferably carried out initially in the absence of surfactants, until the conversion of the polymerization is not less than 60%, preferably not less than 80%. As stated above, a sharp increase in the viscosity of the reaction mixture occurs as the polymerization progresses. In a batchwise polymerization, this phenomenon is evident, for example, by virtue of the fact that the power consumption of the stirrer greatly increases. As soon as the surfactant is added to the resulting polymer gel after not less than 60%, preferably 80%, monomer conversion, a pronounced decrease in the power consumption of the stirrer is recorded. The power consumption declines roughly to the value measured before the beginning of the polymerization during stirring of the polymer solution having virtually the viscosity of water. The moment of surfactant addition, which corresponds to a high monomer conversion, can also be determined by means of the reaction temperature. As soon as the reaction temperature reaches its maximum value, the surfactant is metered in. In a continuous polymerization without the addition of a surfactant the power consumption of the stirrer continues to increase with progressive monomer throughput, until finally the reactor becomes blocked and the stirrer comes to a stop. By metering in the surfactant downstream of the zone of maximum temperature, however, a rapid reduction in the particle size of the polymer gel is achieved and the power consumption of the stirrer is kept at a constant level.

It is possible to use a surfactant or a mixture of a plurality of surfactants. In some cases, the surfactants can also be added in the undiluted state, for example in liquid form, as a melt or as a powder, to the polymerizing reaction mixture. The surfactants may also be added in the form of aqueous solutions, for example having a surfactant concentration of from 5 to 50% by weight. The surfactants are preferably added to the polymerizing mixture in the course of a relatively short time, for example in from one second to 5 minutes, depending on the size of the polymerization batch, after a monomer conversion of not less than 60% or, in the case of adiabatic polymerization, after the peak temperature has been reached. In a continuous polymerization, the stated times correspond to the mean residence time of the reaction mixture in the region where the surfactant is metered in. As soon as the total amount of surfactant has been added to the initially cohesive polymer, the latter disintegrates into small, nontacky particles under the polymerization conditions in the course of a few seconds. This time is detectable from a sharp decrease in the power consumption of the stirrer. Because of the fact that, after the addition of the remaining or total amount of surfactant, the polymer gel disintegrates into fine particles which do not agglomerate with one another and do not adhere to the walls and to the stirrer shafts of the polymerization apparatus, the polymer is not damaged in the further course of the polymerization and of additional working up.

In a continuous polymerization, optimum utilization of the surfactant is preferably achieved by spraying the surfactant at a high flow rate directly into the kneading gap. In this way, the surface newly generated by the division process is wet with surfactant and reagglomeration is prevented.

The surfactant is advantageously sprayed under high pressure of from 0.01 to 100 bar into the relevant kneading gap through a hole provided in the counter-hook. A plurality of these drilled counter-hooks is present over the length of the reaction apparatus, ensuring variability of the point of addition, even during operation. Feed holes which are not in use are sealed flush at the end facing the interior of the reaction apparatus. This can be effected, for example, by means of a spindle, which should be sealed by a suitable seal, for example a gland.

The polymerization can be carried out under atmospheric, reduced or superatmospheric pressure. In some cases, it may be advantageous to remove water from the system during the polymerization itself. By means of evaporative cooling during the polymerization, it is also possible to control or keep constant the polymerization temperature of the reaction mixture. The reaction mixture is preferably not cooled during the polymerization, so that the temperature increases, for example, from 40° C. to 150° C. After the addition of the remaining or total amount of surfactant to the reaction mixture, the polymerization is completed, i.e. the monomers should be as completely polymerized as possible, for example to an extent of 95–99.9%. In some cases, it is possible to achieve even higher conversions. The finely divided, water-soluble polymers obtainable in this manner generally have a mean diameter of from 1 to 50 mm, although, depending on the particular polymerization apparatus used, particle sizes outside the stated range may also occur. These polymer gels may be comminuted with the aid of a conventional comminuting apparatus, for example an extruder, a granulator, a cutting mill or a toothed disk mill, to give particles having a relatively uniform particle size.

The finely divided polymers, which still contain water, can be dried in the kneader to give finely divided polymers having water contents of from 0.1 to 15% by weight. If desired, the water-containing, finely divided polymers can also be dried outside the polymerization apparatus in a conventional drier, for example a belt drier, a fluidized bed drier or a paddle drier. The finely divided polymers may furthermore be comminuted to a smaller particle size, for example by milling, after the drying step.

The novel process gives finely divided, water-soluble polymers having K values of not less than 70, preferably from 90 to 300. Water-soluble copolymers, in particular copolymers of acrylamide, are used as strength agents and retention aids for paper and as flocculants and sedimentation agents in mining and in the treatment of municipal wastewaters. Water-soluble copolymers, in particular copolymers of acrylic acid and sodium acrylate, are used, for example, as sizes for textile fibers.

In the Examples which follow, percentages are by weight. The K values of the polymers were determined according to H. Fikentscher, Cellulosechemie 13 (1932), 58–64 and 71–74. $K = k \times 10$. The measurements were carried out in 5% strength sodium chloride solution at a polymer concentration of 0.1% by weight and at 25° C. and at a pH of 7.

The following surfactants were used in the Examples:

---

Surfactant 1: Disodium salt of ricinoleic acid monoethanolamidosulfosuccinate

-continued

Surfactant 2: Ricinoleamidopropyltrimethylammonium methosulfate
Surfactant 3: EO/PO/EO block polymer (*) having a mean molecular weight of 3,000
Surfactant 4: Ethoxylated PO adduct with ethylenediamine, having a mean molecular weight of 12,200 and a degree of ethoxylation of 70%

Note (*):
EO = ethylene oxide
PO = propylene oxide

General Method for the Polymerization

The aqueous monomer solutions stated in the Examples are introduced into a single-screw kneader preheated to a wall temperature of 60° C. As soon as the temperature of the monomer solution has increased to 40° C., 25 ml of a 3% strength aqueous solution of 2,2-azobis-(amidinopropane) dihydrochloride are metered in. After a short induction time, the temperature of the reaction mixture begins to increase and reaches its maximum value within a short time. The resulting polymer gel begins to disintegrate into coarse fragments. About 1 minute after the maximum temperature has been reached, 1%, based on the amount of monomer, of a surfactant stated in each of the Examples is metered in. As a result, division of the coarsely crumb-like polymer gel into small particles occurs within a few seconds. At the same time, the power consumption of the stirrer, which has increased during the polymerization reaction, decreases to the value measured before the beginning of the polymerization during stirring of the monomer solution having virtually the viscosity of water. After subsequent polymerization for about 5 minutes, the polymer gel is discharged from the reactor and dried in a drying oven under reduced pressure. The polymerization is carried out under a nitrogen atmosphere in all cases.

EXAMPLE 1

An aqueous monomer solution was prepared by mixing 250 g of water, 448 g of 50% strength aqueous acrylamide solution, 120 g of N,N'-dimethylaminoethyl acrylate (neutralized with half the molar amount of 37.5% strength aqueous sulfuric acid), 7.15 g of a 1% strength pentasodium diethylenetriaminepentaacetate and 8.0 g of a 10% strength aqueous solution of formic acid. After the temperature had reached its maximum value of 78° C. 1% by weight, based on the monomers, of surfactant 1 was added in the course of 0.1 minute. A finely divided, water-soluble polymer gel which could be readily discharged was obtained. It had a mean particle size of from 2 to 3 mm. The polymer had a K value of 201.

EXAMPLES 2 TO 4

Example 1 was repeated, except that the surfactants stated in Table 1 were used instead of surfactant 1. The mean particle diameter of the resulting finely divided polymers and the K value are shown in Table 1.

TABLE 1

| Example | Surfactant used | Mean particle size of the polymers [mm] | K value of the polymers |
| --- | --- | --- | --- |
| 2 | Surfactant 2 | 2.5 | 207 |
| 3 | Surfactant 3 | 4 | 203 |

TABLE 1-continued

| Example | Surfactant used | Mean particle size of the polymers [mm] | K value of the polymers |
| --- | --- | --- | --- |
| 4 | Surfactant 4 | 4.5 | 199 |

EXAMPLE 5

An aqueous monomer solution was prepared by mixing 452 g of acrylamide, 650 ppm of formic acid, 360 ppm of pentasodium diethylenetriaminepentaacetate and 506 ml of water. This monomer solution was polymerized by the abovementioned general method at a wall temperature of the kneader of 50° C. As soon as the maximum polymerization temperature of 58° C. had been reached, 1% by weight, based on the monomer used, of surfactant 1 was added in the course of 0.2 minute. The polymerization was carried out at 180 mbar from the beginning. A free-flowing, finely divided polymer gel having a K value of 170 was obtained. The particles had a mean diameter of 3 mm.

EXAMPLE 6

The monomer solution consisted of a mixture of 225 g of water, 628 g of 50 % strength aqueous acrylamide solution, 165 g of acrylic acid, 188 g of 50% strength aqueous sodium hydroxide solution and 0.3 g of pentasodium diethylenetriaminepentaacetate. The monomer solution also contained 0.1 mol %, based on the monomers, of formic acid. The polymerization was carried out in the kneader described in the general method, but at a wall temperature of 50° C. When the reaction mixture had reached a maximum temperature of 77° C., 1% by weight, based on the monomers used, of surfactant 1 was added in the course of 0.1 minute. After the addition of the surfactant, the polymer gel separated into a finely divided product which was still slightly tacky on the surface. The polymer had a K value of 225 and a mean particle size of 2.5 mm. The polymer could be dried to give a virtually completely nontacky finely divided product.

EXAMPLE 7

An aqueous monomer solution was prepared by mixing 345 g of water, 564 g of a 50% strength aqueous acrylamide solution, 67.5 g of acrylic acid, 105 mg of pentasodium diethylenetriaminepentaacetate, 45 mg of sodium hexametaphosphate, 450 mg of diethylenetetramine and 69 g of a 50% strength aqueous sodium hydroxide solution. A pH of 10 ws obtained by adding 10% strength ammonia solution. The polymerization was carried out in the single-screw kneader described in the general method, at a wall temperature of 50° C. After the reaction mixture had reached a maximum temperature of 79° C., 1%, based on the monomers used, of surfactant 3 was added. The polymer gel then separated into fine particles having a mean particle diameter of 2.5 mm. A polymer having a K value of 240 was obtained.

EXAMPLE 8

The monomer solution consisted of a mixture of 340 g of acrylic acid 114 g of sodium hydroxide 40 of pentasodium diethylenetriaminepentaacetate and 7.1 g of formic acid in 600 ml of water. The polymerization was carried out in accordance with the abovementioned general preparation method, except that 2.5 g of ammonium peroxydisulfate in 90 ml of water were used as the initiator. After the reaction mixture had reached a maximum temperature of 75° C, 1%, based on acrylic acid, of surfactant 1 was added in the course of 0.5 minute. A free-flowing polymer which had a K value of 103 and a mean particle diameter of 4 mm was obtained.

EXAMPLE 9

An aqueous monomer solution which consisted of 22 kg of water, 51 kg of 50% strength aqueous acrylamide solution, 12.5 kg of acrylic acid, 13.9 kg of 50% strength aqueous sodium hydroxide solution and 7.8 g of pentasodium diethylenetriaminepentaacetate was prepared. The solution additionally contained 0.15 mol % of formic acid.

The monomer solution was metered continuously in the course of 8.5 hours into a 16 l continuous single-screw kneader at an internal reactor pressure of 260 mbar and a reactor temperature of 50° C. Immediately before the monomer solution entered the kneader, an initiator solution which consisted of 52.3 g of 2,2'-azobis(amidinopropane) dihydrochloride in 1,000 g of water was mixed in during the entire feed time in a mixing chamber.

Immediately after entering the reactor, the reaction mixture began to heat up and reached the maximum temperature after a short time. This polymerization zone remained stationary at this point during the entire feed time.

Directly downstream of this zone, a surfactant solution (consisting of 1,500 g of a 30% strength aqueous solution of surfactant 1) was metered in continuously. A finely divided free-flowing polymer gel which had a K value of 248 was discharged.

EXAMPLE 10

In the polymer gel obtained according to Example 9, 95% of the gel particles had a diameter of less than 10 mm after said gel had been discharged from the kneader. Individual particles may have a larger diameter. To reduce the drying time and to achieve a uniform degree of drying, it is possible to comminute the polymer gel to a more uniform particle spectrum in an apparatus in which the rotor and stator are equipped with knives (cutting mill). Comminution of the polymer gel takes place in the narrow gap present between the rotor and the stator.

Comminution of the polymer described above was carried out by a method in which some of the polymer a) was passed through the comminution apparatus and b) initially the coarse fraction was separated off from the other part of the polymer and only this fraction was comminuted separately in the apparatus described to a particle size of 2 to 3 mm.

We claim:

1. A process for the preparation of a finely divided, water-soluble polymer comprising, polymerizing an aqueous solution in not less than 20% strength by weight of water-soluble, monoethylenically unsaturated monomers in the presence of a free radical initiator in a kneader with formation of a finely divided, water-soluble polymer gel, wherein from 0.1 to 10% by weight, based on the total monomers, of a surfactant is used in the polymerization, initially polymerizing said aqueous solution to a conversion of the monomers of not less than 60% in the absence of surfactants or in the presence of not more than 50% of the total amount of surfactant, and then adding the remaining amount of surfactant to the reaction mixture and completing the polymerization.

2. A process as claimed in claim 1, wherein the monomers are first polymerized in the absence of a surfactant to a conversion of not less than 80%, and the total amount of surfactant is then added.

3. A process as claimed in claim 1, wherein a mixture of
   a) water-soluble, monoethylenically unsaturated monomers and
   b) not more than 20 mol %, based on the monomers (a), of water-insoluble, monoethylenically unsaturated monomers is polymerized.

* * * * *